United States Patent
Roberts

[11] 3,766,781
[45] Oct. 23, 1973

[54] APPARATUS FOR TEMPERATURE MEASUREMENT

[75] Inventor: Thomas Ernest Edwin Roberts, Birmingham, England

[73] Assignee: Joseph Lucas (Industries) Limited, Birmingham, England

[22] Filed: Mar. 29, 1971

[21] Appl. No.: 128,863

[30] Foreign Application Priority Data
Apr. 28, 1970 Great Britain.................. 20,371/70

[52] U.S. Cl............................................. 73/355 R
[51] Int. Cl............................. G01j 5/24, G01j 5/62
[58] Field of Search.................... 73/355 R, 355 EM

[56] References Cited
UNITED STATES PATENTS

| 3,111,032 | 11/1963 | Wormser et al. | 73/359 |
| 3,621,258 | 11/1971 | Dreitzler | 73/355 R X |
| 3,293,915 | 12/1966 | Banca et al. | 73/355 R |
| 3,441,846 | 4/1969 | Petrohilos | 73/362 AR X |
| 3,309,881 | 3/1967 | Beerman | 73/355 R X |
| 3,161,771 | 12/1964 | Engborg et al. | 73/355 R X |
| 3,350,562 | 10/1967 | Flint | 73/355 R X |

Primary Examiner—Richard C. Queisser
Assistant Examiner—Frederick Shoon
Attorney—Holman & Stern

[57] ABSTRACT

An apparatus for measuring the temperature of an infra-red source includes provision for modulating the output of an infra-red sensitive device and for generating a signal in synchronism with peaks of the modulated output, said signal being used to control a switch so as to provide a d.c. signal porportional to the levels of said peaks. A circuit, which generates a function which is the inverse of the relationship between the source temperature and the d.c. signal, provides an output for the apparatus which has a linear relationship with the temperature.

14 Claims, 3 Drawing Figures

APPARATUS FOR TEMPERATURE MEASUREMENT

This invention relates to apparatus for temperature measurement, and has as an object to provide such an apparatus in a convenient form.

According to the invention an apparatus for temperature measurement comprises a means sensitive to infrared radiation and adapted to provide a voltage signal whose magnitude is dependent on the level of the said radiation, means for modulating the said voltage signal to provide an alternating signal, a demodulator for the said alternating signal, the said demodulator comprising a means for generating a train of pulses which are substantially in synchronism with the peaks of the said alternating signal and switching means for the alternating signal operable by each of the said pulses, and linearising means operable by the demodulated signal to provide an output which is linearly dependent on the temperature of a substance providing the infra-red radiation.

The invention also resides in the combination of an apparatus for temperature measurement of the kind defined above with a temperature measuring device having a high steady-state stability and means whereby the output of the said device is modified by the said apparatus except in steady-state conditions.

An apparatus according to the invention will now be described by way of example and with reference to the accompanying drawings in which.

Figure 1:
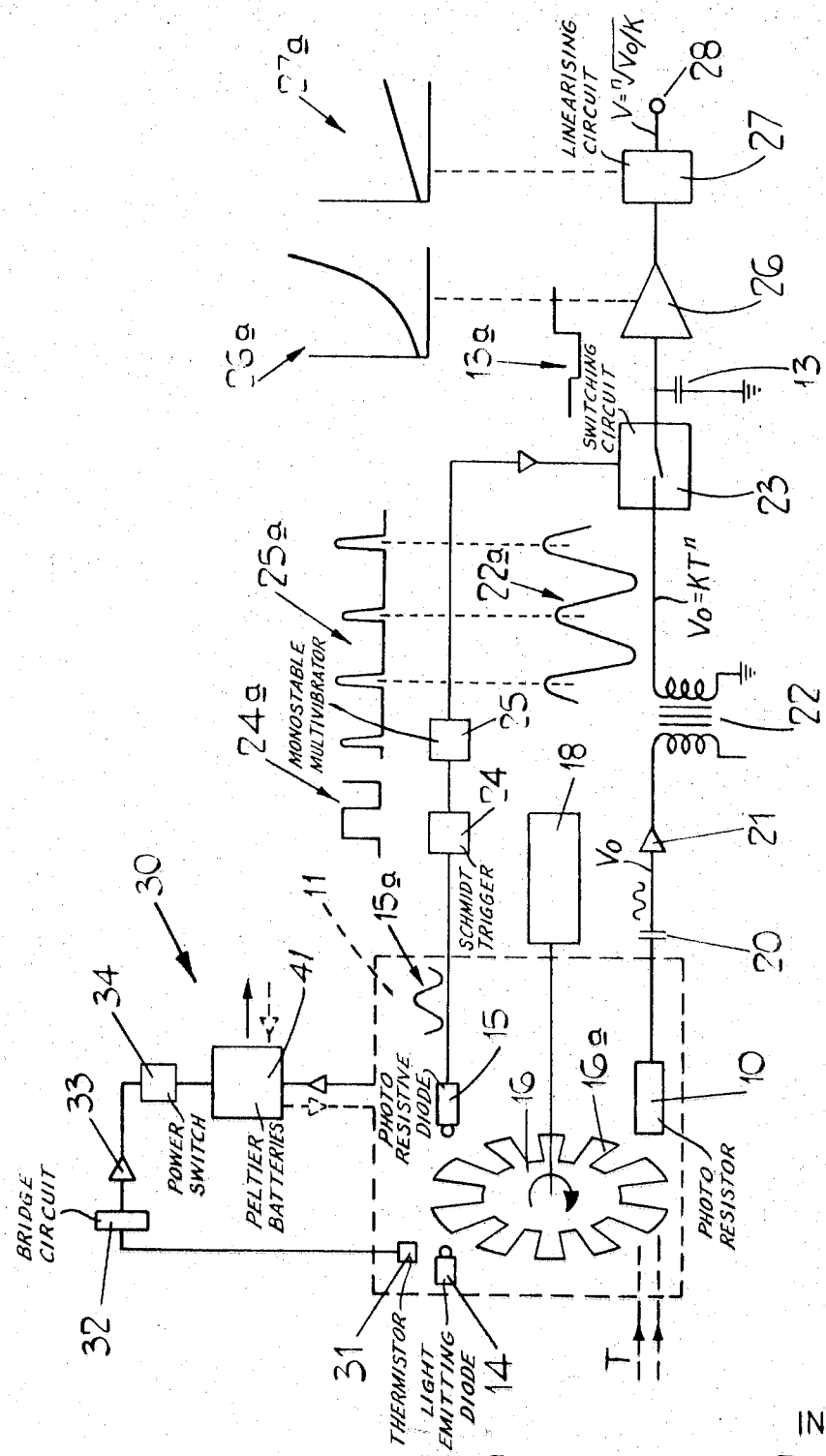
FIG. 1 shows such an apparatus diagrammatically.
Figure 2:
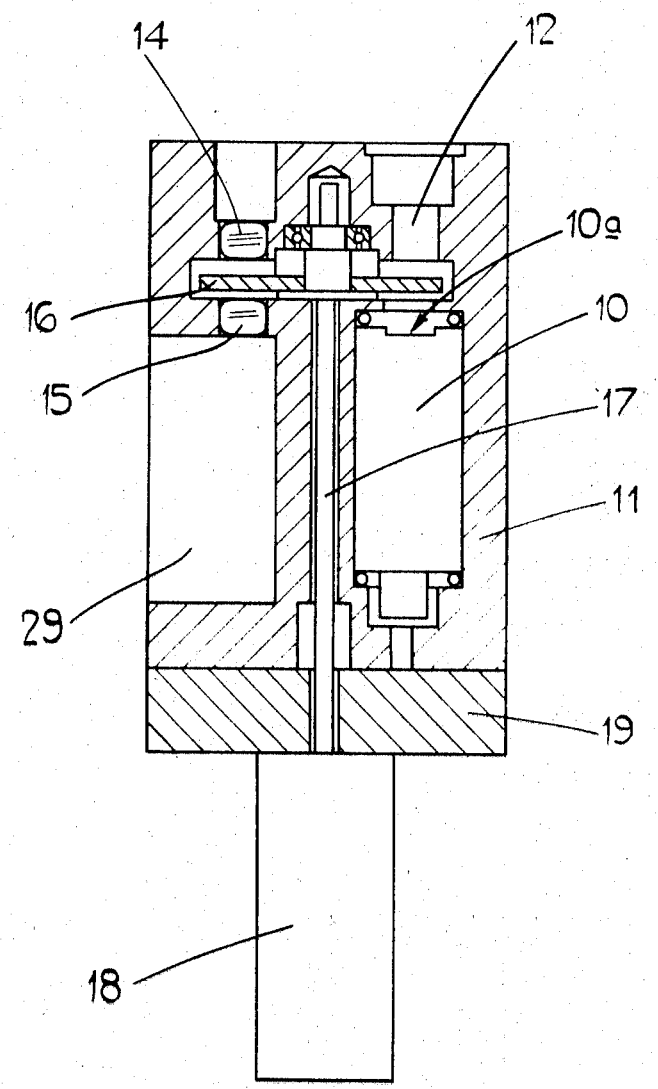
FIG. 2 shows, somewhat diagrammatically, a section through part of the apparatus of FIG. 1.

A photo-resistive device 10, sensitive to infra-red radiation has an external power source (not shown). Device 10 is mounted in an aluminium block 11 and has its sensitive area 10a directed towards a passage 12 opening on to the outside of the block 11. Also mounted in the block 11 is a gallium arsenide light emitting diode 14 and an adjacent photo-resistive diode 15 directed towards the diode 14. A disc 16 is journalled in the block 11 and coupled by a shaft 17 to a motor 18. A block 19 of insulating material is secured between the block 11 and the motor 18. The disc 16 lies between the diodes 14, 15 and also between the device 10 and the passage 12. The disc 16 is formed with ten equi-spaced slots 16a having a mark-spaced ratio of one to one. The device 10 and diodes 14, 15 are positioned in the block 11 so that device 10 and diode 15 are rendered, in use, conductive simultaneously. The output of the device 10 is connected via a capacitor 20 and an amplifier 21 to the primary of a transformer 22.

The secondary winding of the transformer 22 is connected to an input of an electronic switching circuit 23. The output of the diode 15 is connected via a Schmitt trigger circuit 24 and a monostable multivibrator 25 to the switching circuit 23, the output of the multivibrator providing the control signal for the circuit 23. The output of the circuit 23 is connected via an amplifier 26 to a linearising circuit 27 whose function will later be described. A capacitor 13 is connected between earth and the junction of circuit 23 and amplifier 26. The output 28 of the circuit 27 provides the output of the apparatus.

The block 11 is formed with a recess 29 within which is mounted a temperature control arrangement 30 for the block 11. The arrangement 30 includes a thermistor 31 secured to the block 11 and responsive to the temperature thereof. Thermistor 31 forms part of a bridge circuit 32 whose output is supplied via a amplifier 33 which includes a Schmitt trigger circuit to control a power switch 34. The arrangement 30 also includes a number of Peltier batteries 41 which are supplied with power via the switch 34 and are secured in good thermal contact with the block 11. The Peltier batteries 41 may be stacked so that the hot plate of one battery is in contact with the cold plate of an adjacent battery. The block 11 may in this way be maintained at a considerable temperature difference above or below the ambient temperature.

In use, the apparatus is mounted so that the passage 12 is directed towards an object or substance whose temperature is to be measured. Rotation of the disc 16 by the motor 18 causes infra red radiation falling on the device 10 to be chopped. The output of the device 10 is thus a voltage waveform whose amplitude corresponds to the difference between maximum infra red input and no infra red input. Any inaccuracy due to a variable output from the device 10 at zero infra-red input is thus eliminated. The D.C. component of the voltage waveform is eliminated by the capacitor 20 to provide a signal which passes via the amplifier 21 and transformer 22 to the switch 23. The signal has at this stage a waveform shown at 22a.

Diode 15 is subjected to light from the diode 14 and produces an output of the form shown at 15a which is squared by the Schmitt trigger 24 to the form shown at 24a.

Multivibrator 25 is controlled by the waveform shown at 24a to produce the pulse train 25a, each pulse of which is in synchronism with the peaks of the waveform 22a. The output, of the switching circuit 23 is thus a series of pulses whose levels correspond to the levels of the peaks of the waveform 22a. The output pulses of the circuit 23 charge the capacitor 13 to provide the waveform shown at 13a which is amplified in the amplifier 26. The output $Vo$ of the device 10, and hence the waveform 13a has an exponential relationship to the temperature T of the object or substance being measured, as shown by the curve 26a. Circuit 27 effectively generates a function which is the inverse of the aforesaid exponential relationship, whereby the signal at the output 28 has a linear relationship, as shown at 27a with the temperature being measured. For example, when $Vo = KT^n$, the inverse function is $T = \sqrt[n]{Vo/K}$.

Figure 3:
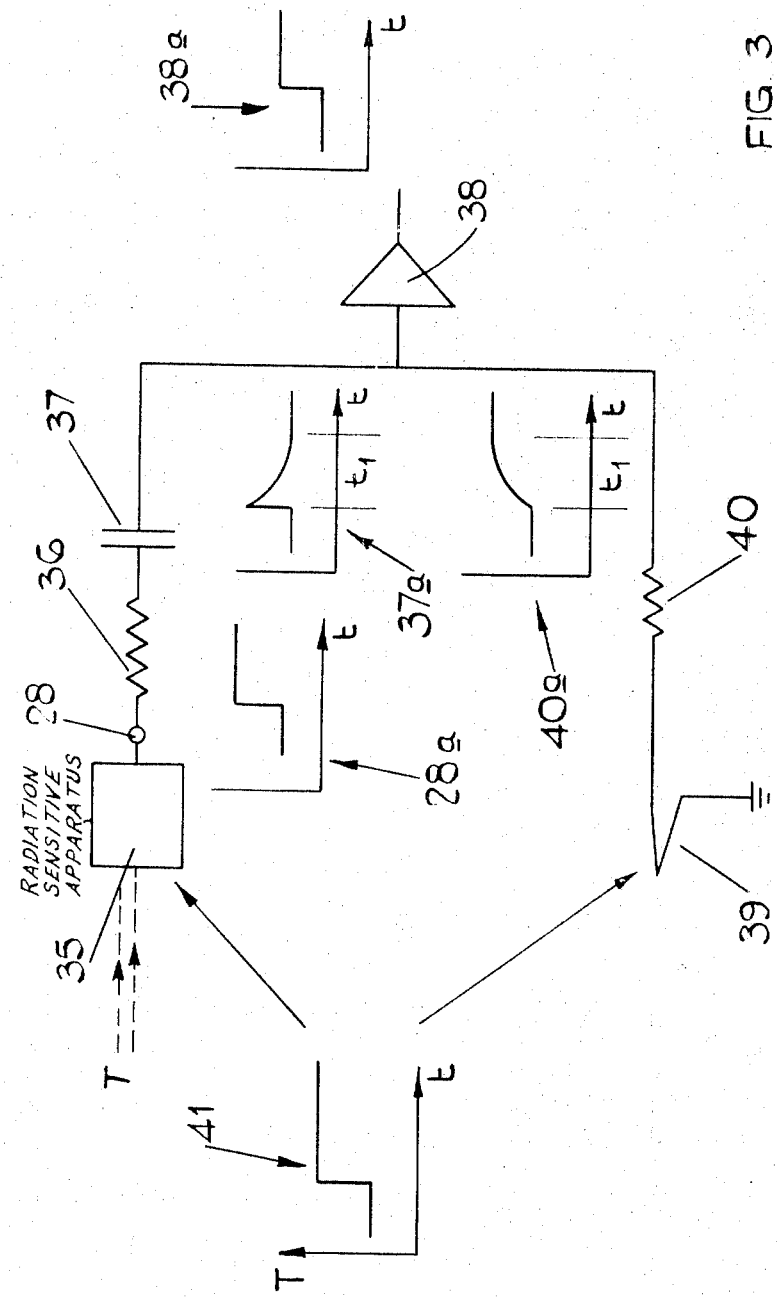
FIG. 3 shows an arrangement incorporating the apparatus of FIG. 1.

FIG. 3 shows an arrangement in which an apparatus 35, substantially as previously described, has its output 28 connected via a resistor 36 and a capacitor 37 to an amplifier 38. A thermocouple 39 is connected via a resistor 40 to the amplifier 38. In use the apparatus 35 and thermocouple 39 are arranged to be subjected to the same temperature, which temperature may vary with time over a predetermined range, as shown at 41. The values of resistors 36, 40 are such that the output currents of the apparatus 35 and thermocouple 39 are substantially identical. The time constant of the thermocouple 39 for the aforesaid temperature range may be determined. The value of the capacitor 37 is such that the time constant of the resistor 36 and capacitor 37 is substantially equal to the time constant of the thermocouple 39.

Radiation sensitive devices typically have short response-times, but low steady-state stability. This means that for a constant level of radiation input, the output signals of these devices tend to vary. This disadvantage offsets the advantageous short response-times of these devices. Conversely, thermocouple devices have good steady-state stability but disadvantageously long response-times.

The apparatus shown in FIG. 3 enables the short response-time of a radiation sensitive device to be combined with good steady-state stability of a thermocouple. Specifically, in the embodiment illustrated in FIG. 3, the thermocouple 39 which is responsive to the temperature of the substance giving out infrared radiation provides a first current signal through resistor 40. A second current signal initially substantially equal in magnitude to the first signal after a change of temperature of said substance is provided through resistor 36. The second signal decays to a zero value with a time constant substantially equal to that of the thermocouple. The first and second current signals are summed in a means provided therefor, and amplifier 38, for example, so as to provide a reading which has the short response-time of the device 35 and the good steady-state stability feature of thermocouple 39.

The voltage waveform 28a which is produced at output 28 as a result of the temperature step shown at 41 produces, downstream of the capacitor 37, the current waveform shown at 37a having a time constant $t_1$. The current waveform from the thermocouple 39 resulting from the same temperature step is shown at 40a. The magnitudes and time constants of the wave forms 37a, 40a are, as described, substantially identical and when summed in the amplifier 38 produce the waveform shown at 38a. The output of the arrangement thus has a response time equal to that of the apparatus 35, and at the same time has a steady state stability equal to that of the thermocouple 39.

Having thus described my invention what I claim as new and desire to secure by Letters Patent is:

1. An apparatus for temperature measurement comprising a means sensitive to infra-red radiation and adapted to provide a voltage signal whose magnitude is dependent on the level of said radiation, an occulting shutter between said infra-red sensitive means and an associated source of infra-red radiation, whereby said voltage signal comprises an alternating signal, a demodulator for said alternating signal, said demodulator generating a train of pulses which are substantially in synchronism with the peaks of said alternating signal, said demodulator including a pulse shaping circuit and a monostable multivibrator, switching means for the alternating signal operable by each of said pulses, and linearising means operable by the demodulated signals to provide an output which is linearly dependent on the temperature of a substance providing the infra-red radiation.

2. An apparatus as claimed in claim 1 in which said means sensitive to infra red radiation is a photo-resistive device.

3. An apparatus as claimed in claim 1 in which said shutter comprises a disc formed with equi-spaced circumferential apertures, and which includes means for rotating said disc.

4. An apparatus as claimed in claim 3 in which said apertures are formed so as to provide a mark-space ratio of one to one for the shutter.

5. An apparatus as claimed in claim 1 in which said demodulator further includes a light source, a photo-resistive device and a shutter between said source and said photo-resistive device.

6. An apparatus as claimed in claim 5 in which said shutter between said source and said photoresistive device is constituted by the shutter associated with said infra-red sensitive means.

7. An apparatus as claimed in claim 5 in which the light source is a gallium arsenide diode.

8. An apparatus as claimed in claim 1 in which said linearising means comprises a circuit for generating a function which is the inverse of the relationship between the temperature to be measured and the voltage signal provided by said infrared sensitive means.

9. An apparatus as claimed in claim 1 which includes a metal block with which said infra-red sensitive means and said shutter are in thermal contact.

10. An apparatus as claimed in claim 9 which includes temperature control arrangement for said block.

11. An apparatus as claimed in claim 10 in which said temperature control arrangement includes a Peltier effect device in thermal contact with said block and switching means responsive to the temperature of said block for regulation a current supply of said Peltier effect device.

12. An apparatus for temperature measurement comprising means sensitive to infra-red radiation and adapted to provide a voltage signal whose magnitude is dependent on the level of said radiation, means for modulating the impingement of said radiation on said radiation sensitive means, whereby said voltage signal is an alternating signal, a demodulator for said alternating signal, said demodulator comprising means for generating a train of pulses which are substantially in synchronism with the peaks of said alternating signal, switching means for the alternating signal operable by each of said pulses, linearising means operable by the demodulated signal to provide an output which is linearly dependant on the temperature of a substance providing the infra-red radiation, and a thermocouple disposed to sense the temperature of said substance to provide a first current signal which changes with a known time constant for a given change in said temperature, the apparatus also including means responsive to the output of said linearising means to provide, in response to said temperature change, a second current signal initially substantially equal in magnitude to the magnitude of the first current signal after said change, said second current signal decaying to zero with a time constant substantially equal to that of said thermocouple, and means for summing the first and second current signals.

13. An apparatus as claimed in claim 12 in which said means responsive to the output of the linearising means comprises a resistance and capacitance arrangement having a time constant equal to that of said thermocouple.

14. An apparatus as claimed in claim 12 in which said summing means is an amplifier.

* * * * *